T. D. ADAIR, Jr.
CARBURETER ADJUSTING DEVICE.
APPLICATION FILED JULY 6, 1918.

1,338,849. Patented May 4, 1920.

WITNESSES

INVENTOR
T. D. Adair, Jr.
BY
ATTORNEYS

UNITED STATES PATENT OFFICE.

THOMAS DONALD ADAIR, JR., OF BOSTON, MASSACHUSETTS, ASSIGNOR TO STANDARD THERMOMETER COMPANY, OF BOSTON, MASSACHUSETTS.

CARBURETER-ADJUSTING DEVICE.

1,338,842.          Specification of Letters Patent.          Patented May 4, 1920.

Application filed July 6, 1918. Serial No. 243,549.

*To all whom it may concern:*

Be it known that I, THOMAS D. ADAIR, Jr., a citizen of the United States, and a resident of Boston, in the county of Suffolk and State of Massachusetts, have made certain new and useful Improvements in Carbureter-Adjusting Devices, of which the following is a specification.

My present invention relates generally to carbureter devices, and more particularly to a device of this nature for application to Ford automobiles, to permit of intelligent manipulation and control of the needle valve of the carbureter from an instrument board installed as usual beneath the cowl rearwardly of the dash.

It is well known that all speedometer manufacturers now supply with their speedometers an instrument board for Ford cars, which when installed makes it very difficult for the driver of the car to intelligently manipulate the rigid carbureter control supplied with the car, and to this end my invention dispenses with the usual rigid carbureter control, and substitutes therefor a flexible control, that is, one flexible to the extent that it is both adjustable and jointed, but sufficiently rigid to maintain the correct carbureter adjustment in the use of the car. By supplying a control located at the instrument board, I overcome the difficulties of the usual construction, and eliminate the necessity of the driver reaching so far forward as is required with the rigid carbureter control located upon the dash.

In the accompanying drawing illustrating my present invention:—

Figure 1:
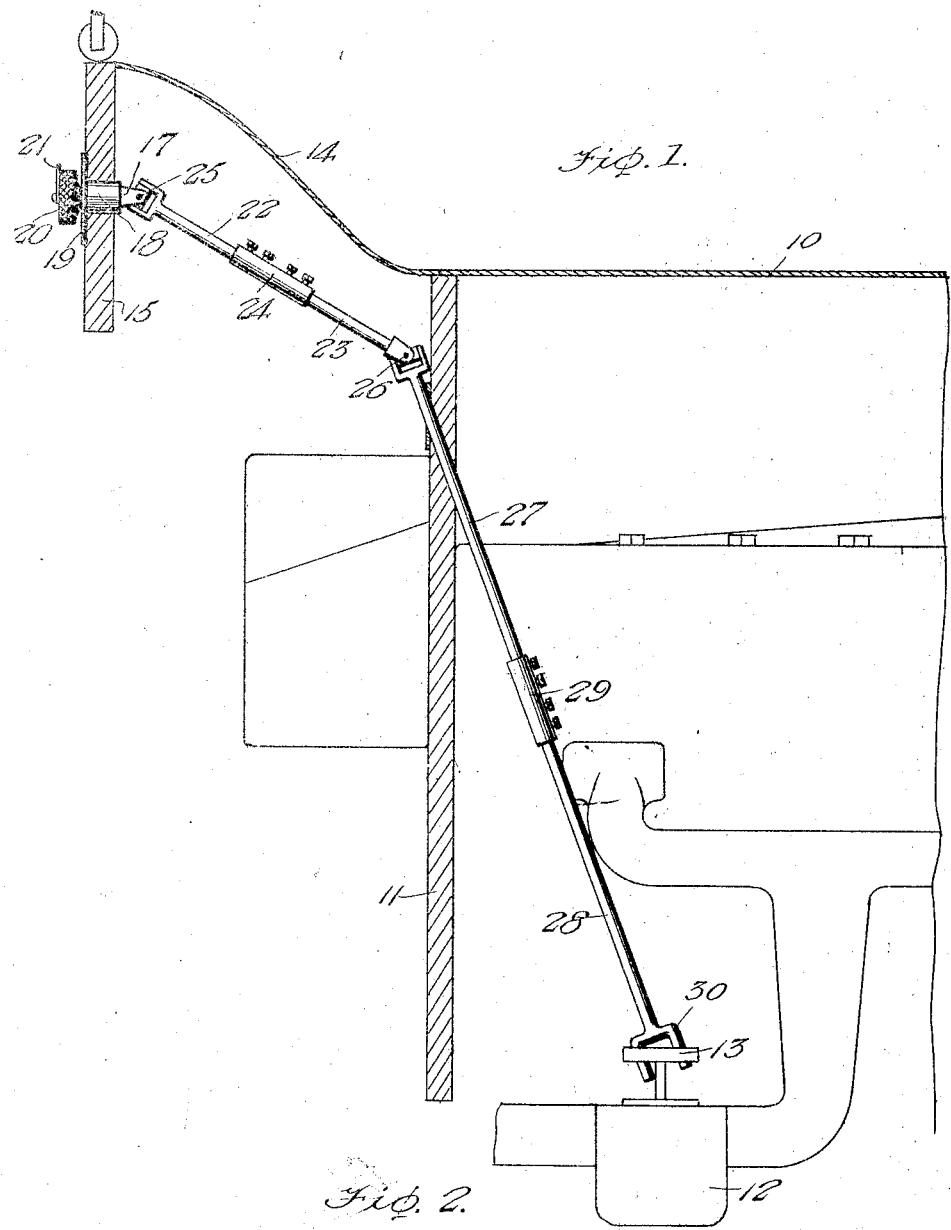
Figure 2:
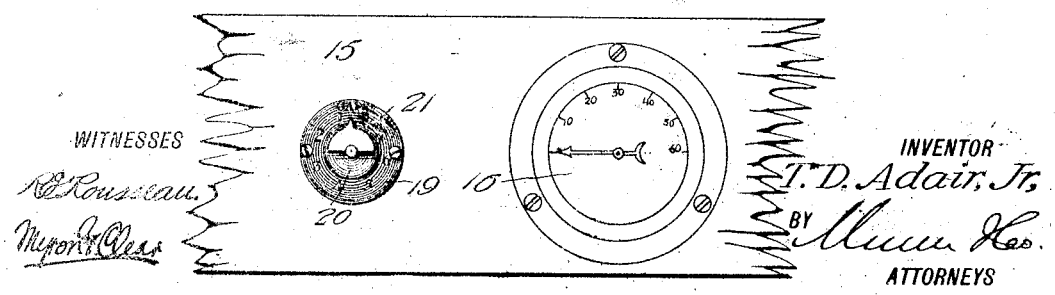

Figure 1 is a vertical longitudinal section through the rear portion of the hood, dash and cowl of a Ford car, showing an instrument board in position and my improved control in connection therewith, and, Fig. 2 is a face view of a portion of the instrument board seen in section in Fig. 1.

Referring now to these figures, Fig. 1 includes at 10 the hood of a Ford car, extending forwardly from the upper portion of the dash 11 and within which hood is inclosed the engine and certain other parts, including the carbureter 12, a portion of the needle valve of which appears at 13.

The cowl is seen at 14, and an instrument board 15, such as supplied by numbers of manufacturers with speedometers 16 thereon, as seen in Fig. 2, appears in Fig. 1, in relation to the dash 11, from which it will be observed that the location of the instrument board 15 materially to the rear of the upper portion of the dash, makes it extremely difficult for an operator to intelligently manipulate the rigid carbureter control usually supplied with Ford cars, and located on the dash.

In accordance with my invention a three section control shaft is utilized to control the needle valve 13 of the carbureter, the upper rear section 17 being mounted through the instrument board 15 and through a bearing sleeve 18 extending through said instrument board, the latter having a dial plate 19 upon the rear face of the instrument board and the shaft section 17 having a rear knurled knob 20 carrying a rigid pointer 21, whose apex projects slightly beyond the periphery of the knob 20, and may thus be felt in the dark or where such light as there is, is insufficient to distinctly discern the same.

The intermediate shaft section extends from a point slightly forward of the instrument board 15, and is inclined forwardly and downwardly, as shown in Fig. 1, to a point adjacent the rear surface of the dash 11, and is in two parts, 22 and 23, connected by a sleeve coupling 24, the rear end of the shaft part 22 being connected by a universal joint 25 with the forward end of the shaft section 17 above referred to.

The forward end of the forward part 23 of the intermediate shaft section is connected by a universal joint 26 with the upper rear end of the forward shaft section, which latter is inclined downwardly at an abrupt angle with its rear upper portion mounted through the dash 11, and is likewise in two parts 27 and 28, connected by an intermediate sleeve coupling 29. The lower forward end of the forward part 28 is seen provided with a fork 30, engaging the needle valve 13, but it is obvious that it may be provided with any other suitable means such as a clamp and the like in connection, for instance, with a joint, which will bring about its connection with the needle valve.

It is to be observed that the bearing sleeve 18 exceeds in diameter the sleeve coupling 24 and the diameter of the universal joint 25. This permits the sleeve coupling and universal joint attached to the knob 20 to be inserted through the hole bored in the instrument board, thus facilitating the assemblage of the control in the car. When the dial plate 19, which is attached to the bearing sleeve 18, is locked in position in the dash, it is turned to the correct position and secured in place by a couple of screws. The rigid pointer 21 is adjustably secured to the knob 20 so that after the device is assembled in the car the pointer may be loosened and the carbureter needle adjusted to the correct position for running while the engine is hot, and with the carbureter thus adjusted and the knob in the correct position for such running, the pointer will be turned to a certain neutral position near the top of the dial and then fixed on the knob in this position. Thereafter when the user starts the engine he will take hold of the knob and know its position by the touch and thus be enabled to open it the desired amount for starting and move it back again to its running position. It will also be observed that the knob and knob shaft are permanently secured in the bearing sleeve. It is also to be noted that the sleeve couplings uniting the upper section and the intermediate section of the control shaft, as well as the coupling uniting the intermediate section to the rear end of the forward section, are heavy substantial couplings each secured by two set screws to both shaft ends united by them.

It is obvious from the foregoing that my invention constructed as above described, and as shown, may be installed quickly, and without trouble, and avoids the necessity of exact location with respect to the instrument board, having a fair range of location thereon by virtue of its adjustable parts.

It is furthermore obvious that while providing for desired and necessary flexibility, my invention avoids springiness or other characteristics tending toward incorrect adjustment or accidental displacement in the use of the car.

I claim:—

1. The carbureter control device for automobiles having, in combination, a bearing sleeve provided with a flange adapted to be supported in the instrument board of the car, the flange having provision for securing the bearing sleeve in position in the instrument board, a handle pivotally mounted in the bearing sleeve, a universal joint connected with the handle forward of the bearing sleeve, a shaft piece connected with the universal joint and extending forwardly, a second shaft piece connected to the first shaft piece by a sleeve coupling, a universal joint at the forward end of the second shaft piece located near the dash, a third shaft piece extending up through the dash and attached to said universal joint, a fourth shaft piece connected to the third shaft piece by a sleeve coupling and provided on its forward end with a fork adapted to engage the needle valve.

2. The carbureter control device for automobiles having, in combination, a fork section provided at one end with a fork and on the other end with a shaft coupling, a second shaft section consisting of two portions united by a universal joint, a third section consisting of a shaft having a coupling at one end, a universal joint at the other, and a handle section connected with the universal joint and supporting a bearing sleeve, the bearing sleeve being larger in diameter than the universal joint and the shaft connection, the whole being adapted to be disassembled for the purpose of shipment and assembled in place on automobiles by thrusting the lower end of the second section shaft through the carbureter adjustment hole in the dash and connecting it to the shaft coupling on the carbureter section, inserting the shaft coupling and universal joint of the third section through and the bearing sleeve through a hole in the dash, uniting the upper end of the intermediate shaft with the lower end of the third section shaft.

THOMAS DONALD ADAIR, Jr.

Witnesses:
  MARIE L. HENER,
  WALTER C. KNIGHT.